United States Patent
Hill et al.

(10) Patent No.: US 7,283,468 B1
(45) Date of Patent: Oct. 16, 2007

(54) METHOD AND SYSTEM FOR CONTROLLING NETWORK TRAFFIC WITHIN THE SAME CONNECTION WITH DIFFERENT PACKET TAGS BY VARYING THE POLICIES APPLIED TO A CONNECTION

(75) Inventors: Mark Hill, Los Altos, CA (US); Brett Galloway, Los Altos, CA (US); Anne Cesa Klein, Cupertino, CA (US)

(73) Assignee: Packeteer, Inc., Cupertino, CA (US)

( * ) Notice: Subject to any disclaimer, the term of this patent is extended or adjusted under 35 U.S.C. 154(b) by 1109 days.

(21) Appl. No.: 10/099,629

(22) Filed: Mar. 15, 2002

(51) Int. Cl.
*H04J 3/14* (2006.01)
*H04J 1/16* (2006.01)

(52) U.S. Cl. .............. 370/229; 370/468; 370/230; 370/235

(58) Field of Classification Search .......... 370/229, 370/230, 230.1, 235, 236, 395.1, 395.2, 395.21, 370/395.4, 395.41, 395.42, 395.43, 468
See application file for complete search history.

(56) References Cited

U.S. PATENT DOCUMENTS

2006/0007859 A1\* 1/2006 Kadambi et al. ........... 370/229
2006/0126547 A1\* 6/2006 Puuskari et al. ............ 370/310

\* cited by examiner

*Primary Examiner*—Ajit Patel
(74) *Attorney, Agent, or Firm*—Mark J. Spolyar

(57) ABSTRACT

A method and system for controlling network traffic with different tags within the same connection by applying policies for each tag are disclosed. A method is disclosed in which incoming traffic is received. A traffic class is assigned to the incoming traffic. A policy is assigned to the incoming traffic based on the assigned traffic class. Outgoing traffic is controlled based on the assigned policy for the incoming traffic.

50 Claims, 8 Drawing Sheets

METHOD AND SYSTEM FOR CONTROLLING NETWORK TRAFFIC WITHIN THE SAME CONNECTION WITH DIFFERENT PACKET TAGS BY VARYING THE POLICIES APPLIED TO A CONNECTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to communication networks. More particularly, the present invention relates to controlling network traffic on communication networks. Specifically, the present invention relates to controlling network traffic with different packet tags within the same connection by mapping tags to the same and/or different policies.

BACKGROUND OF THE INVENTION

A communication network includes multiple interconnected devices. Typically, these interconnected devices send messages in data units. For example, a network such as the Internet uses data units called "packets." A number of protocols may be used to control the flow of packets over a network or on the Internet. One protocol that controls the flow of packets over a network or on the Internet is the Transmission Control Protocol/Internet Protocol (TCP/IP). TCP/IP is a connection-oriented reliable end-to-end protocol. That is, the TCP/IP protocol is used to establish and maintain reliable connections between applications on a packet-switched computer network and interconnected systems of such networks. For the delivery of information to be reliable, the packets must be sent and received in sequence by the applications using TCP/IP for communication. [RFC 783]

A network application may embed tags in packets. A tag is a bit or a sequence of bits within a packet that indicates certain characteristics of the packet. There are many possible ways to tag a packet. For example, the IP Type-of-Service (TOS) field is commonly used to tag IP packets. This four-bit sequence has the following standardized values [RFC 1389]:

1000 Minimize delay
0100 Maximize throughput
0010 Maximize reliability
0001 Minimize monetary cost
0000 Normal service In previous implementations of tagging, the packets in a TCP/IP connection, if tagging was used, were commonly tagged with a constant value over the entire connection. Examples of packet tags that are constant include a tag that indicates that this is a high priority connection, or a tag that indicates that this connection should not be distributed among multiple application servers. For example, when TOS is used to tag TCP/IP packets, typically, all of the packets in a TCP connection share the same TOS value. One of the most frequent uses of TOS is as a tag that indicates the priority of the packet.

Tagged packets in TCP/IP convey information about the packet that can be used to determine the significance of the packet. This significance can be enforced by the application of network traffic control policies to that packet. A network traffic control policy, or "policy," controls the handling of the packet and the TCP/IP connection to which it belongs. Examples of policies include priority queueing and TCP rate control; the former is commonly known, and the latter is disclosed in the prior art.

When packet tags do not vary over the course of the connection, any policy that is applied to a connection based on the initial packet tag value functions appropriately over the course of the connection.

A more recent introduction is the implementation of tags that vary from packet to packet over the course of the connection. Examples of packet tags that vary include a single bit that indicates the priority of the packet or multiple bits that indicate the type of information that the packet contains. For example, in Citrix MetaFrame 1.8 with Feature Release 1, or in Citrix MetaFrame XP, each packet is tagged with information that indicates information about the ICA Virtual Channel to which the packet belongs. As there are many virtual channels in use over the course of a Citrix ICA connection, the tags vary significantly over the course of a flow.

When packet tags vary over the course of a connection, a simple interpretation of such tags may not have the desired effect with regards to the traffic connection. That is, a policy applied to a connection based on the initial packet tag value does not function appropriately over the course of the connection, because the tags and the significance of the packets vary. For example, a packet with a tag that indicates that it is urgent may be significantly delayed because the initial packet of the connection indicated that this was an unimportant connection, and the policy that was applied to the connection assigned the connection a low priority.

An additional problem is inherent in applying a policy to each tagged packet within the connection. For example, when configuring a queuing policy that creates a priority queue for each packet tag, each packet is placed in a queue according to its tag, and transmitted in the order of relative importance to the other packets in the connection. However, TCP/IP is a connection-oriented reliable end-to-end protocol, and relies on sequential delivery of packets. Because TCP/IP guarantees in-order delivery to the application, this adds significant latency to the connection. That is, if a high priority packet follows a low priority packet while there is network congestion, the high-priority packet arrives potentially long before the lower-priority preceding packet. Because the high priority packet is received out of sequence, the TCP/IP stack on the receiving side retains the high priority packet, waits to receive the low priority packet, and, if the low priority packet is not received, requests retransmission of the unreceived low priority packet. The recipient then waits again for the low priority packet and may request a retransmission again if the packet is not received. Meanwhile, the high priority packet may time out, and the recipient may need to request the high priority packet again. The result is that the throughput of the connection is severely degraded as the connection is dominated by TCP/IP retransmit timeouts, and bandwidth is wasted as the high priority packets are subsequently resent. Because of this throughput degradation, there is no value to sending the later higher priority packet prior to the preceding lower-priority packet.

Thus, what is needed is a flexible way to control traffic flow such that packets with differing packet tags within the same connection are handled in a varying but controllable manner.

SUMMARY OF THE INVENTION

A method and system for controlling network traffic with different packet tags is disclosed. In one embodiment, the method comprises assigning a traffic class to incoming traffic within a connection based on a first packet tag of a first packet in the incoming traffic within a connection based on a first packet tag of a first packet in the incoming traffic and changing the traffic class based on a second packet tag of a second packet within the connection in the incoming traffic, such that the connection is reclassified in response to changes in packet tags.

Other features and advantages of the present invention will be apparent from the accompanying drawings, and from the detailed description, which follows below.

BRIEF DESCRIPTION OF THE DRAWINGS

The present invention is illustrated by way of example, and not limitation, by the figures of the accompanying drawings in which like references indicate similar elements and in which.

DETAILED DESCRIPTION

Figure 1A:
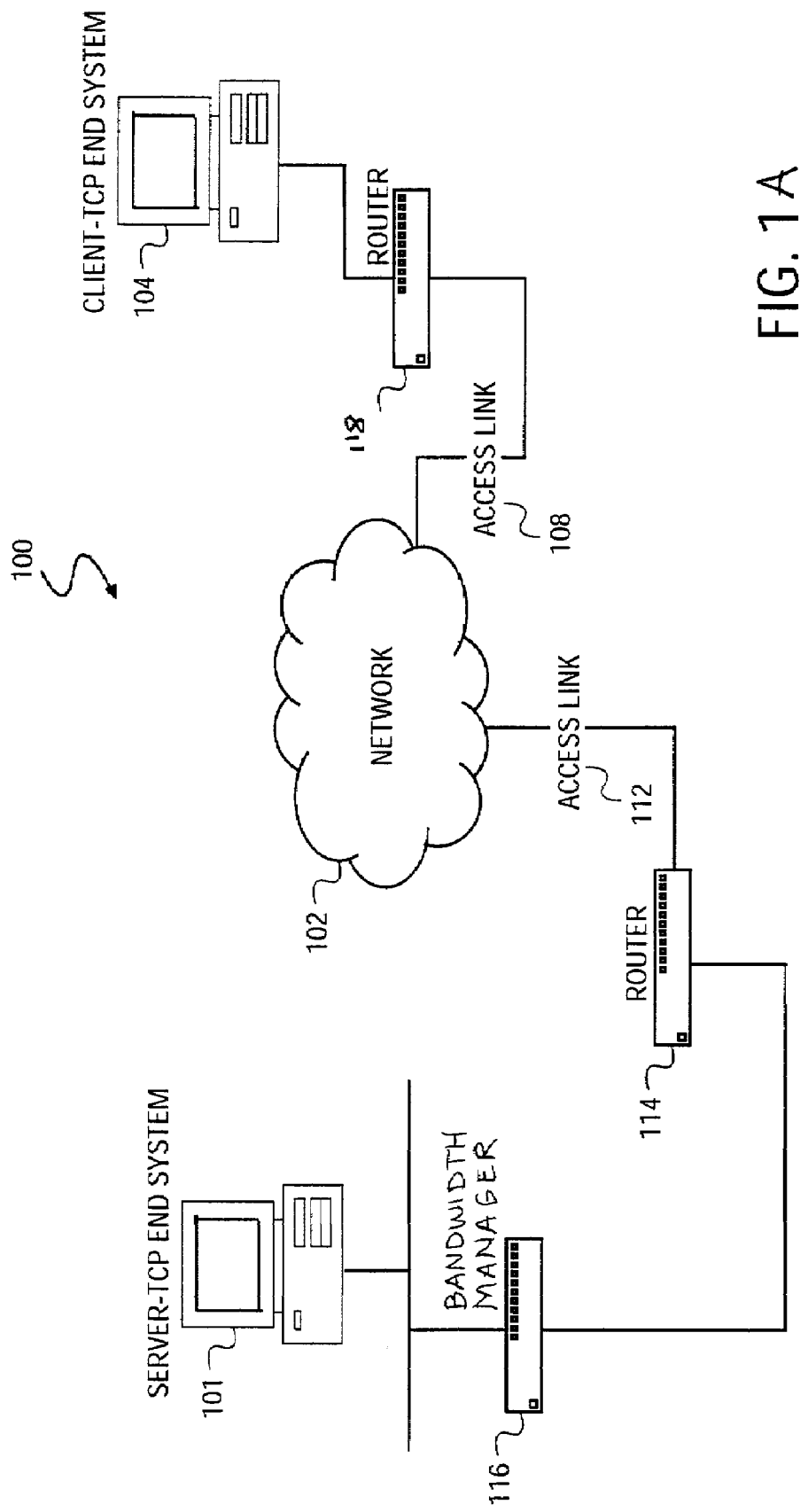
FIG. 1A illustrates one embodiment of a network environment.

A method and system for controlling network traffic with different packet tags by applying different policies for each tag within the same connection are described. In one embodiment, as incoming traffic is received, a traffic class is assigned to the incoming traffic flow based on the tag or tags contained in the packet. In other words, the connection is assigned a traffic class. The connection is moved between classes as the tags change. That is, the entire connection is reclassified based on a packet tag within the traffic. In one embodiment, the packets in the connection are in order and out of order delivery causes problems in the network. A policy is assigned to the incoming traffic based on the assigned traffic class. Outgoing traffic in the connection is controlled based on the assigned policy for the incoming traffic. Thus, the techniques described herein provide for interpreting tags in such a way that the desired effect occurs (e.g., traffic is managed in accordance with its importance) while allowing additional flexibility of configuration.

The traffic control techniques described herein and in the Appendix provide flexibility in controlling traffic flow. More particularly, packet tags in traffic are not used to directly determine importance, but are used to provide information for a classification process that determines a policy to apply to the traffic.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1A illustrates an exemplary network environment 100 in which the present invention can be implemented. Referring to FIG. 1A, network environment includes a server-TCP end system 101 ("server 101") and a client-TCP end system 104 ("client 104") interconnected by network 102. In the example of FIG. 1A, a single server 101 and client 104 are shown, however, any number of server and clients can communicate with each other via network 102. Server 101 connects to network 102 via bandwidth manager 116, router 114 and access link 112. Client 104 connects to network 102 via router 118 and access link 108.

Figure 7:
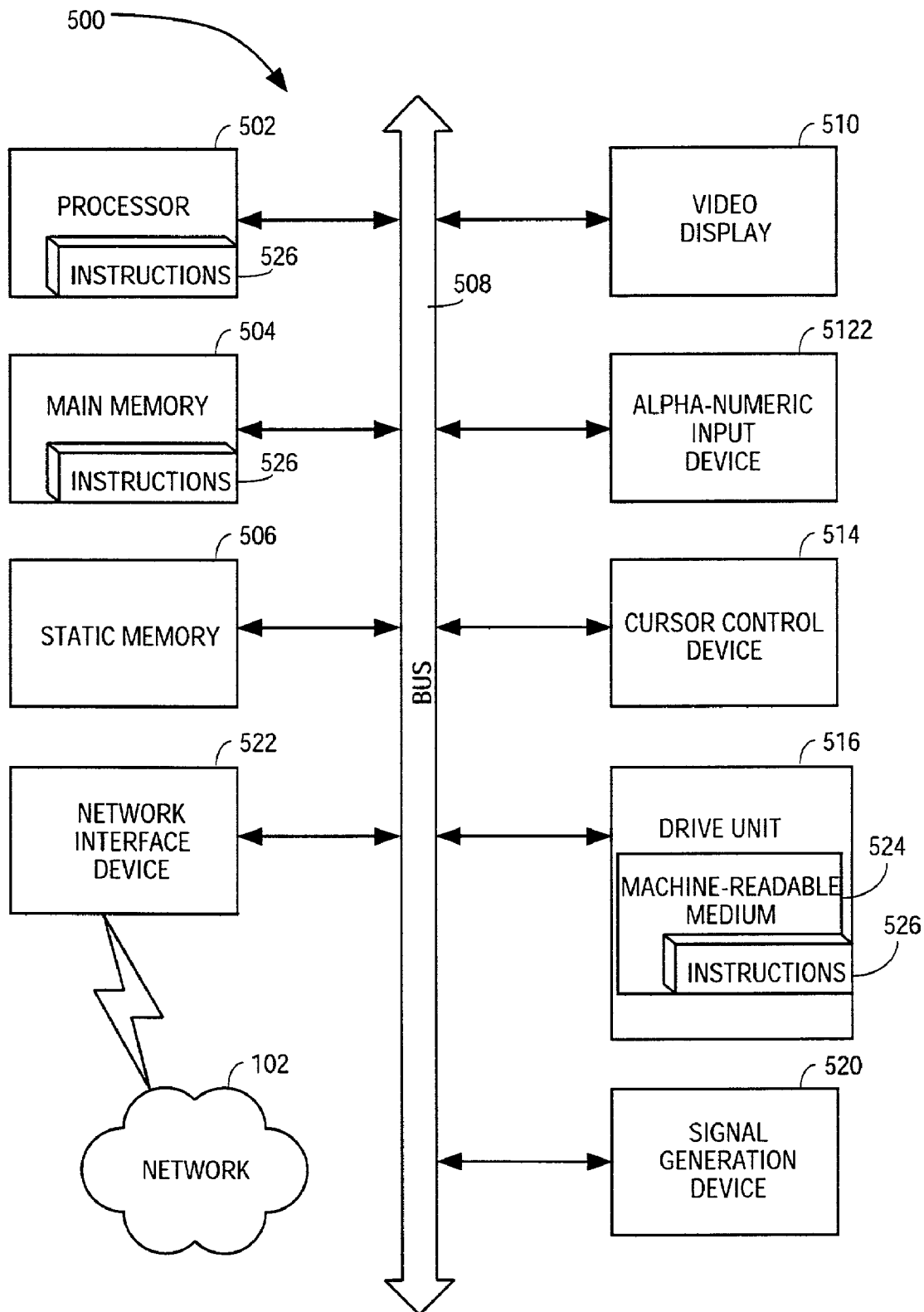
FIG. 7 illustrates an exemplary digital processing system for performing the operation of FIG. 4.

Server 101 and client 104 may be general purpose computers, servers, dedicated machines, workstations, e.g., as shown in FIG. 7. Server 101 and client may include applications for communicating messages in the form packets using the TCP/IP protocol in which network 102 is the Internet. In other embodiments, network 102 may include other types of networks such as a local area network (LAN), token ring network, wide area network (WAN) or other like networks. The present invention is advantageously applied to TCP network-based system or any network system in which communication occurs according to a protocol with a sliding window transport layer. Further, the present invention may be applied to other networks, such as, but not limited to, applications at the link layer in a point-to-point network system. Furthermore, access links 112 and 108 may include a wired and wireless medium.

Routers 116 and 118 are network devices that perform routing and forwarding services for packets being transmitted to and from server 101 and client 104. According to one embodiment, a branch manager 116 is provided between at least one of the end systems (e.g., server 101) and one of the routers (e.g., router 114). Alternatively, bandwidth manager 116 may be situated between client 104 and router 118. In the example of FIG. 1A, bandwidth manager 116 is a network device that controls the traffic (e.g., traffic rate) between server 101 and router 114.

As will be explained in further detail below, bandwidth manager 116 examines tags in received packets to control tagged traffic. In particular, bandwidth manager 116 applies a policy scheme to the tagged traffic.

In the following discussion, the words "outgoing" and "incoming" are used. Often, these terms are in reference to bandwidth manager 116. Individual tagged packets can come from either the server or the client.

Figure 1B:
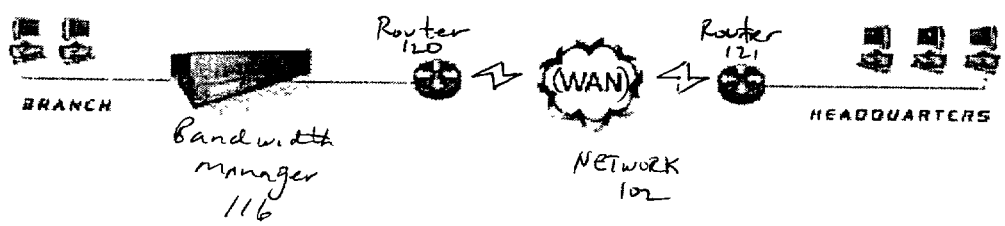
FIG. 1B illustrates an alternative embodiment of a network environment.
Figure 1C:
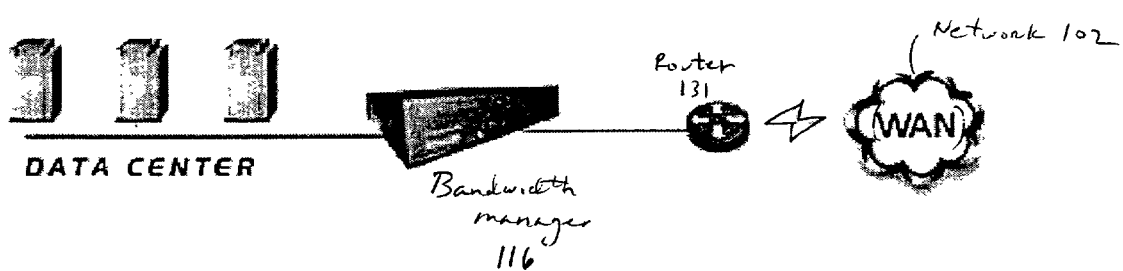
FIG. 1C illustrates another alternative embodiment of a network environment.

FIG. 1B illustrates an alternative embodiment of a network environment. Referring to FIG. 1B, bandwidth manager 116 is located at a branch office. A pair of routers 120-121 provides access to network 102 (e.g., WAN). FIG. 1C illustrates another alternative embodiment of a network environment. Referring to FIG. 1C, bandwidth manager 116 is located at a data center and is given access to network 102 (e.g., WAN) using router 131. Note that in each of these embodiments, bandwidth manager 116 may be part of a router, switch, proxy, bridge, end system, etc.

Figure 2:
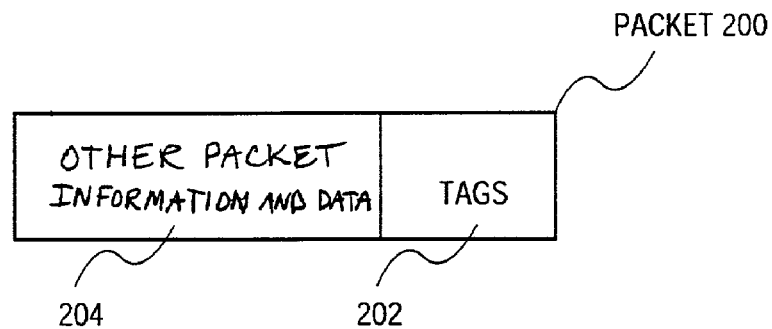
FIG. 2 illustrates an exemplary packet.

FIG. 2 illustrates a diagram of one embodiment of a packet 200. Referring to FIG. 2, packet 200 includes tags 202 and other packet information and data 204. In one embodiment, packet 200 is a packet to communicate messages under the TCP/IP protocol. Tags 202 may include a field to indicate the type of traffic associated with packet 200. Other packet information and data 204 may include information for routing and forwarding of packet 200 by routers 116 and 118. In one embodiment, tags 202 comprise priority tags for use in priority tagging.

In one embodiment, bandwidth manager 116 uses information in tags 202 to assign a class to packet 200, as opposed to using more immediately obvious characteristics such as IP address or port number. Each class has a policy associated with it. After bandwidth manager 116 uses information in tags 202 to classify a traffic type for packet 200, it applies a policy, as will be described herein, to control the forwarding of packet 200.

Figure 3:
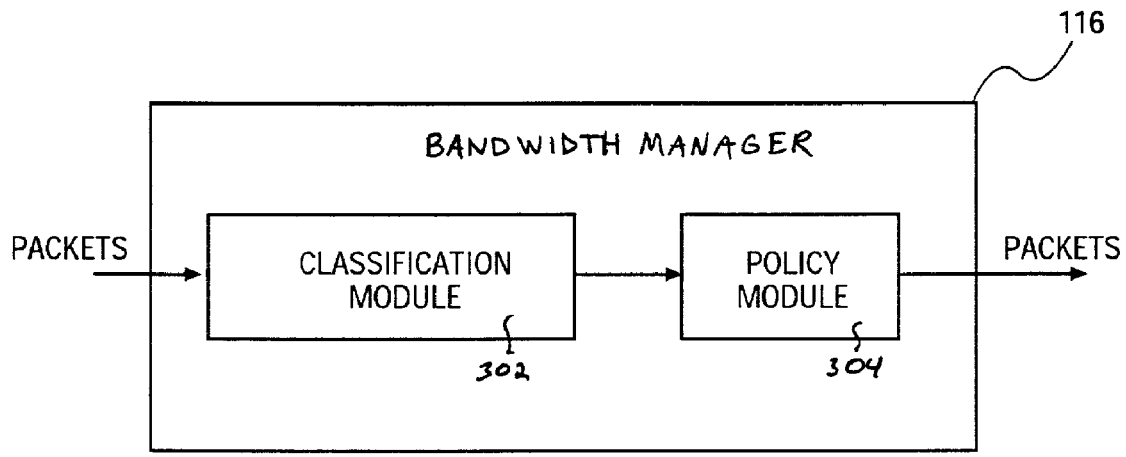
FIG. 3 illustrates a simplified internal block diagram of a bandwidth manager according to one embodiment.

FIG. 3 illustrates a simplified internal block diagram of one embodiment of bandwidth manager 116. Referring to FIG. 3, bandwidth manager 116 includes a classification module 302 coupled to a policy module 304. Classification module 302 and policy module 304 may comprise software and/or hardware modules operating within bandwidth manager 116. For example, classification module 302 and policy module 304 may be software stored in a medium in which a network processor (not shown) within bandwidth manager 116 processes to perform the operations described herein. Classification module 302 and policy module 304 may also be programmable hardware such as a field programmable gate array (FPGA) to perform the operation described herein.

As described above, classification module 302 assigns traffic classes to incoming traffic and may vary the traffic class applied to a single connection when a new, or different, packet tag is encountered. In other words, when a packet tag of a received packet differs from a packet tag for a previously received packet, classification module may reclassify the traffic class of the connection.

Using techniques described herein, an administrator in the classification module of a bandwidth manager in a network determines the relative importance of different types of tagged traffic within one network (e.g., TCP) connection. Then, the administrator can configure the bandwidth manager with classes that may be in either a one-tag-type to one-class configuration, or multiple-tag-types to one-class configuration. Finally, the administrator applies policies to those classes that are in keeping with the importance of the tagged traffic types.

In one embodiment, a bandwidth manager includes an intra-flow policy modulator to modulate the policies applied to packets of a particular connection. This modulator may include classification module 302 and policy module 304 of FIG. 3. In one embodiment, the modulator performs a hysteresis response to upward priority increments. Such a modulator may maintain flow continuity and protect other traffic against low priority traffic. These functions are coincident. For example, in case the packet order is high, low, high, high, high, . . . , then there is no reason to release the third and following (high-priority) packets as they will need to be retransmitted. Thus, sending these packets at high priority is not an efficient use of bandwidth. The hysteresis is performed by the policy module. The policy module can accomplish this in a number of ways, which are described in greater detail below.

Figure 8:
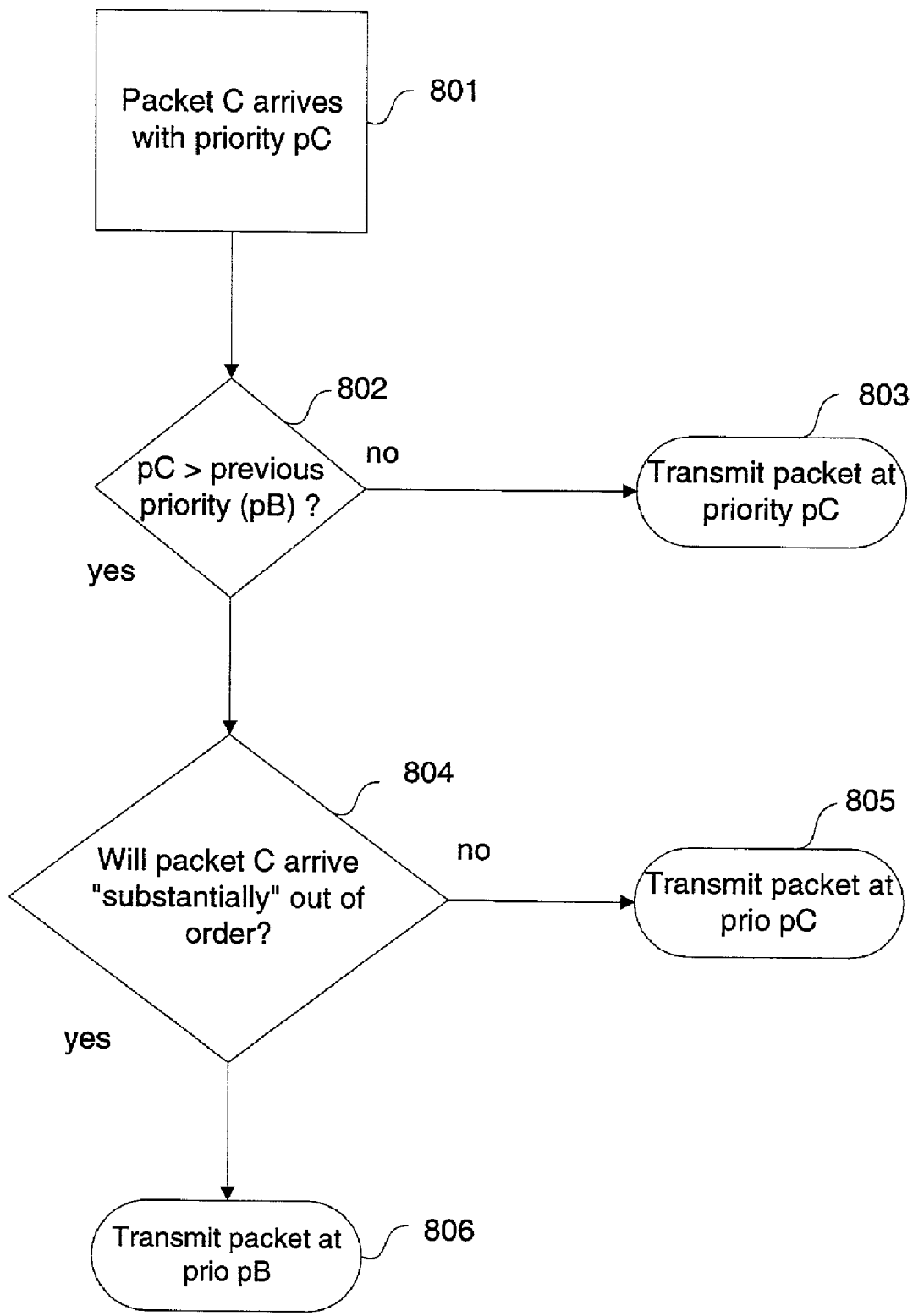
FIG. 8 is a flow diagram of a process performed by a TCP conditioner-based policy modulator on a series of packets being transmitted where each of the packets has a priority.

In an alternative embodiment, the modulator is a TCP conditioning modulator that maintains flow continuity across otherwise discontinuous policy changes. FIG. 8 is a flow diagram of a process performed by a TCP conditioner-based policy modulator on a series of packets being transmitted where each of the packets has a priority. The packets in the series of packets being transmitted are referred to in FIG. 8 as packets A, B, C, D, and E, which are transmitted in order having priorities pA, pB, pC, pD, and pE, respectively. Also assumed is that an estimate is known of the transmission time to the destination for traffic at each priority (xA, xB, xC, xD, xE) and the time when each packet is transmitted (tA, tB, tC, tD, tE).

The process begins when packet C arrives with priority pC (processing block 801). At this time, processing logic in the policy modulator determines whether the priority pC of the incoming packet, packet C, is greater than the priority of the previous incoming packet, packet B (processing block 802). If not, processing logic is the policy modulator transmits packet C at its priority pC (processing block 803). If the priority pC of the incoming packet C is greater than the priority pB of the previous packet B, then processing logic in the policy modulator determines whether packet C will arrive "substantially" out of order (processing block 804). In this case, substantially out of order means that packet C will arrive ahead of packet B such that retransmission of packet B or C will result. This may be calculated from knowledge of the behavior of the TCP stack at the recipient. If not, processing logic in the policy modulator transmits the incoming packet C at priority pC (processing block 805). If packet C will arrive substantially out of order, then processing logic in the policy modulator causes the incoming packet C to be transmitted at the priority pB of the previous packet B.

The operations performed by classification module 302 and policy module 304 will be described in further detail with regards to FIG. 4.

Figure 4:
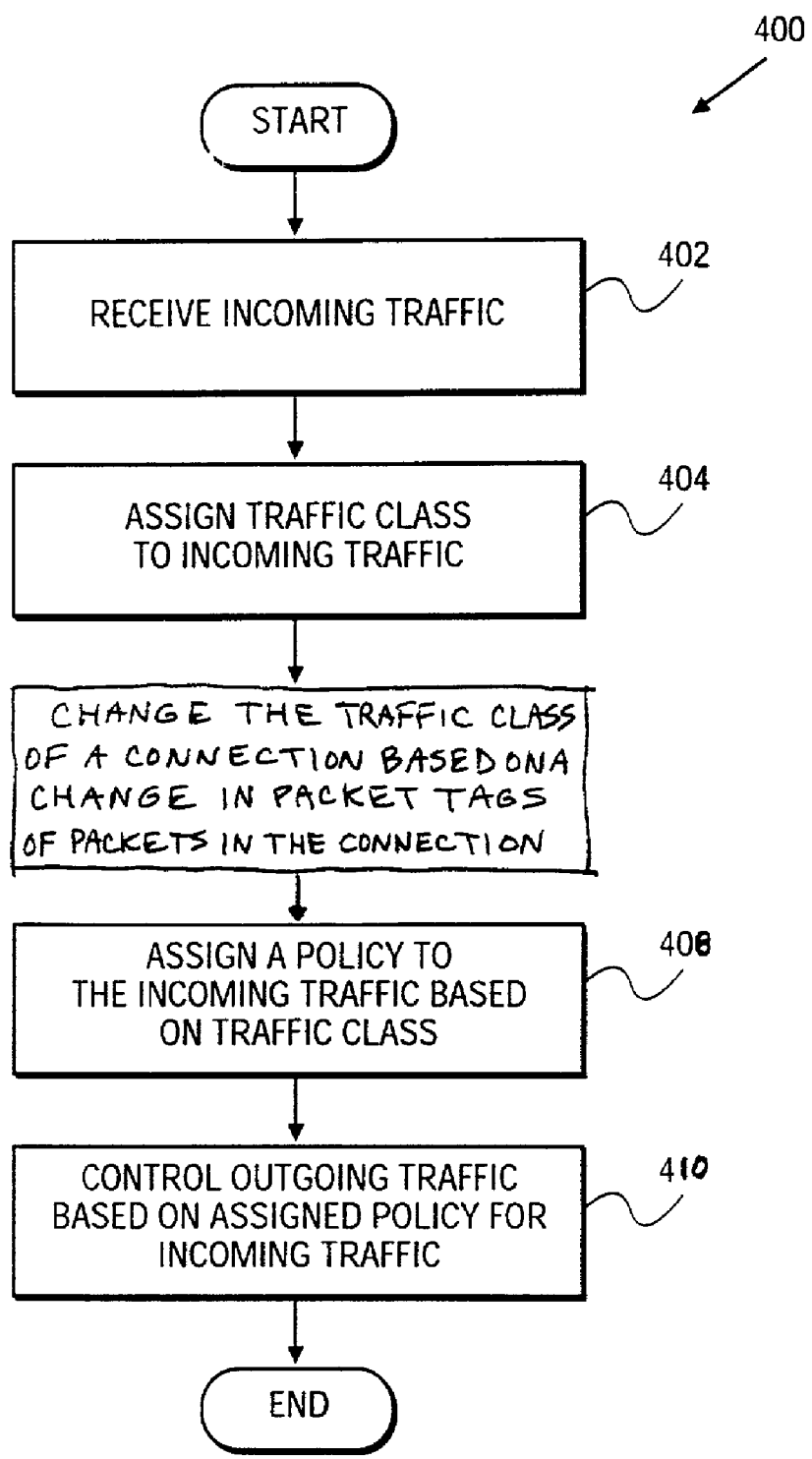
FIG. 4 is a flow diagram of one embodiment of a process for using policies to control traffic.

FIG. 4 illustrates a flow diagram of one embodiment of a process for using policies for controlling traffic. Initially, the process begins at processing block 402, where traffic is received. For example, classification module 302 within bandwidth manager 116 receives packets from server 101 that are to be forwarded to client 104. Each of the packets may embody a packet such as packet 200 having tags 202. For purposes of explanation, in one embodiment, tags 202 for received incoming traffic include information for three different priorities, e.g., A1 (high priority), A2 (medium priority), and A3 (low priority).

At processing block 404, a traffic class is assigned to the incoming traffic flow w of a single connection based on each tag or tags in each packet. For example, classification module 302 examines priority information in tags 202 within incoming traffic. Then classification module 302 assigns a traffic class for the traffic (i.e., packet) based on the examined tags. For example, it tags 202 comprise priority tags, classification module 302 may assign a traffic class for the traffic based on a priority level(s) associated with the priority tags.

An exemplary classification process for assigning a traffic class is as follows. For instance, a traffic class may be assigned to the lowest priority traffic A3 (least important traffic) that has been transmitted on a connection for a certain period of time. For example, for a period of one minute, the traffic class T1 may be used to define A1 traffic transmitted on a connection within the last minute. A traffic class T2 may be used to define A1 or A2 traffic transmitted on the connection in the last minute. Finally, a traffic class T3 may be used define A1, A2, or A3 traffic transmitted on the connection within the last minute. The period and connection are arbitrary and can be applied to any number or types of connections and for any time duration.

At processing block 406, the class assigned to the connection is changed (i.e., reclassified) based on a packet tag (or tags) within the traffic flow. In one embodiment, the reclassification of the connection is performed by the bandwidth manager in cooperation with its administrator.

At processing block 408, a policy is assigned to the incoming traffic based on the traffic class. A policy is a process or processes to handle outgoing traffic based on traffic classification. The mapping of types of tags to traffic classes may be on a one-to-one basis with each tag type being mapped to a different class or on a one-to-many basis in which one traffic class is mapped to may tag types. An exemplary mapping is given below. For example, policy module 304 receives the incoming traffic (or packets) from classification module 302 along with classification information for the traffic and assigns policies to each traffic class. In one example, policy module 304 may assign a policy traffic class T1 to handle high priority traffic (e.g., A1 type traffic). Furthermore, policy module 304 may assign a policy to traffic class T2 in order to handle medium and low priority traffic (e.g., A2 and A3 type traffic).

At processing block 410, outgoing traffic is controlled based on the assigned policy for the incoming traffic. For example, policy module 304 will give less importance to the outgoing traffic flow having priority A3 within the last minute, and other types of traffic will be unaffected. In the above example, by using a policy scheme, additional flexibility and configuration is provided that translates three priority levels into two policy schemes that improve outgoing traffic flow.

Figure 5:
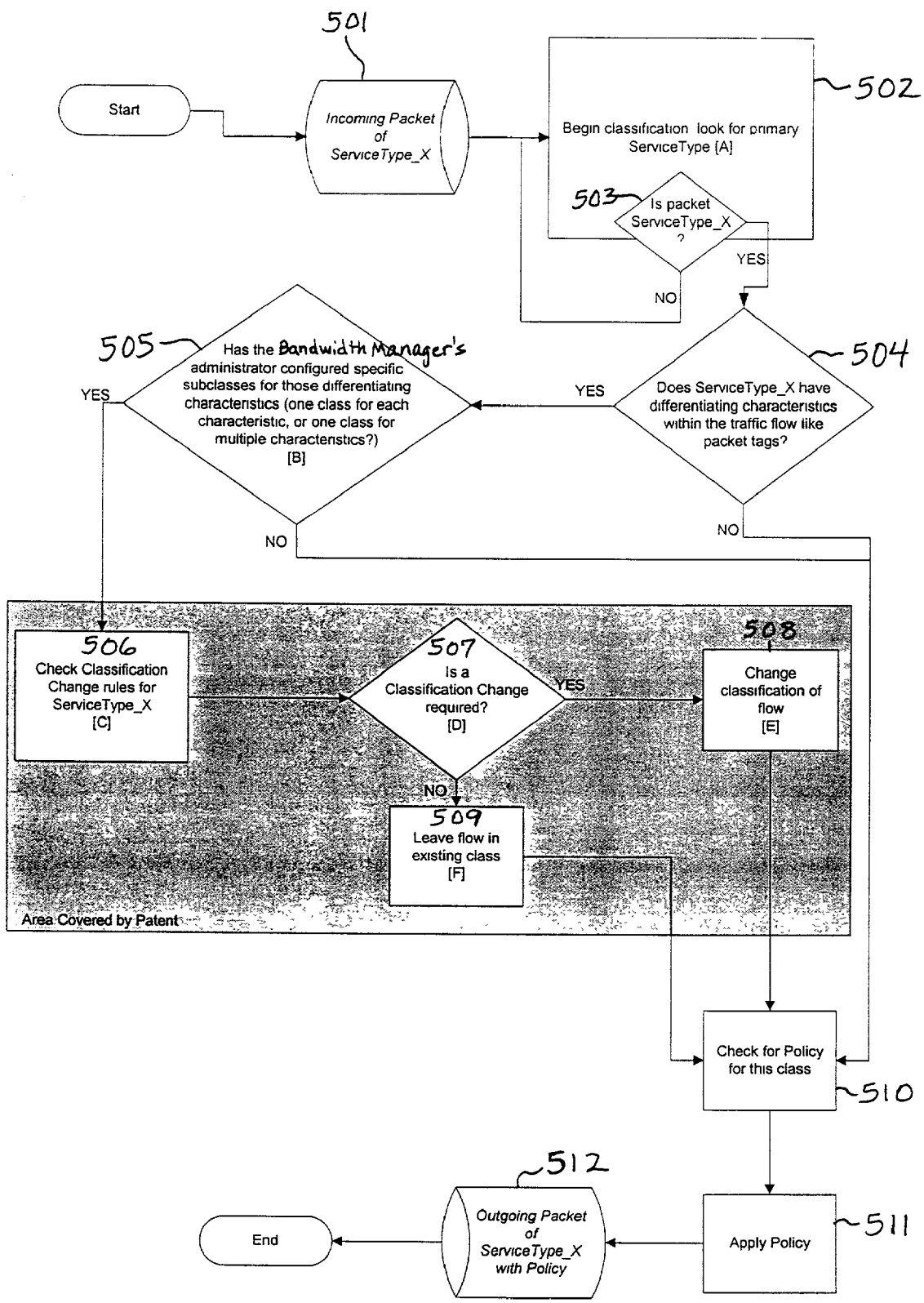
FIG. 5 is a more detailed flow diagram of one embodiment of a process for using policies to control traffic.

FIG. 5 is a more detailed flow diagram of a process for controlling network traffic. The process is performed with processing logic that may comprise hardware, software, or a combination of both. For example, the process may be performed by classification module 302 of FIG. 3.

Referring to FIG. 5, the process begins with an incoming packet of network traffic (processing block 501). This incoming packet represents a service type and is referred to herein as ServiceType_X. In response to the incoming packet, processing logic begins classification (processing block 502). In one embodiment, processing logic begins classification by looking for the primary ServiceType. In one embodiment, a classification module examines the traffic to determine what type of traffic it is. In some cases, it recognizes the type as one that can be subclassified and sends the packet through additional classification routines.

Processing logic tests whether the packet is of ServiceType_X (processing block 503). If not, processing logic transitions back to processing block 502. If the packet is of ServiceType_X, processing logic transitions to processing block 504 where processing logic tests whether ServiceType_X has differentiating characteristics within the traffic flow such as, for example, packet tags. If not, processing logic transitions to processing block 510 where processing logic checks for the policy for the class. If the ServiceType_X has differentiating characteristics within the traffic flow such as, for example, packet tags, then processing logic tests whether the administrator of the bandwidth manager has configured specific subclasses for those differentiating characteristics (one class for each characteristic, or one class for multiple characteristics) (processing block 505). In one embodiment, the administrator configures the bandwidth manager in order to set up classes that handle a single packet tag type or multiple packet tag types. The administrator also may choose to set policies on those classes.

If the administrator has not configured specific subclasses for the differentiating characteristics, processing logic transitions to processing block 510 where processing logic checks for the policy for the class.

If the administrator has configured specific subclasses for the differentiating characteristics, then processing logic checks classification change rules for ServiceType_X (processing block 506). These rules determine whether the connection should switch between traffic classes and vary from service type to service type. These rules can be based on time, frequency, importance of different tags, averages, weighted moving average, fuzzy logic algorithms, or other logical, chronological, mathematical, or computational mechanisms.

Once the classification change rules have been checked, processing logic tests whether a classification change is required (processing block 507). The tag may or may not activate the rule that requires a classification change. In one embodiment, all of the changes depend on the rules for that service type.

If a classification change is required, processing logic changes classification of flow (processing block 508) and processing transitions to processing block 510. That is, if the packet tag requires that the flow to be changed, processing logic changes the classification of the flow, thereby moving the flow from one class to another.

If a classification change is not required, processing logic leaves the flow in existing class (processing block 509) and processing transitions to processing block 510. In other words, processing logic does not move the flow to a different class.

At processing block 510, processing logic checks for the policy for this class. After checking for the policy, processing logic applies the policy (processing block 511). Once the policy that corresponds to the class is applied to the connection, the policy is applied to the packet and the packet is put out onto the network (processing block 512).

The flow diagram of FIG. 5 may be better understood with the use of some examples. In a first example, for ServiceType_1, an administrator has defined two classes, ServiceType_1*a*, which covers packets tagged as both "Urgent" and "Important", and ServiceType_1*b*, which covers traffic tagged with "Normal", "Less Important", and "Bulk" tags. Thus, each class is mapped to multiple tags. ServiceType_1*a* has an administrator-assigned priority policy of 7, which prioritizes the traffic for that class above all other network traffic. ServiceType_1*b* has an administrator-assigned priority policy of 2, which means that it has a lower priority than standard network traffic.

When the packets are tagged with an "Urgent" or "Important" tag, the bandwidth manager immediately moves the flow to the ServiceType_1*a* class and applies the priority policy. Using techniques described herein, the bandwidth manager only switches the flow back to the ServiceType_1*b* class if it has seen 30 packets that are not urgent or important.

In a second example, for ServiceType_2, the administrator has defined three classes: ServiceType_2*a*, ServiceType_2*b* and ServiceType_2*c*. ServiceType_2*a* corresponds to traffic tagged as database synchronization traffic. ServiceType_2*b* is set up to match traffic with tags that correspond to data entry or screen refresh. ServiceType_2*c* matches traffic for screen copy or print screen. ServiceType_2*a* has a rate control policy of 10 k burstable to 20 k. ServiceType_2*b* has a rate control policy of 10 k, capped, with no ability for additional bandwidth. ServiceType_2*c* has a rate control policy of 5 k burstable to 10 k, but only if there is bandwidth available.

In one embodiment, if the traffic is in the ServiceType_2*b* class, it takes 10 seconds of database synchronization traffic to switch over to the ServiceType_2*a* class, but it will take 50 seconds of screen copy or print screen traffic to switch to the ServiceType_2*c* traffic class. If the traffic is in the ServiceType_2*a* class, it will take 50 seconds of either data entry/screen refresh before the bandwidth manager switches the class to the ServiceType_2*b* class, and 50 seconds of either screen copy or print screen traffic before the bandwidth manager switches the class over to the ServiceType_2*c* class. If the traffic is in the ServiceType_2*c* class, it takes 10 seconds of data entry/screen refresh before the bandwidth manager switches the class over to ServiceType_2*b*, and 10 seconds of database synchronization before the bandwidth manager switches the class over to the ServiceType_2*a* class.

In a third example, for ServiceType_3, the administrator has defined two classes. ServiceType_3*a* corresponds to interactive traffic of varying packet tags. ServiceType_3*b* corresponds to file copies. ServiceType_3*a* has a rate control policy of 20 k burstable to 40 k. ServiceType_3*b* has a rate control policy of 15 k firm, so that the file copies won't overwhelm the interactive traffic.

If the traffic is in the ServiceType_3*a* class, the bandwidth manager switches the connection to ServiceType_3*b* if the weighted moving average of packet types shows >75% of packets tagged with the ServiceType_3*b* tag. The bandwidth manager switches the connection back to ServiceType_3*a* when the weighted moving average drops below 50% tagged with the ServiceType_3*b* tag.

Mapping of Tagged Packets to Classes of a Specific Service Type

In one embodiment, as described above, tagged packets map to an administrator-defined service class. However, in alternative embodiments, several types of tags may map to a single service class, but one type of tag cannot map to multiple service classes. This gives the administrator the flexibility to decide which tags map to what service class, since the service class is administrator-defined. The policy is associated with the service class, and is also administrator-defined.

Figure 6:
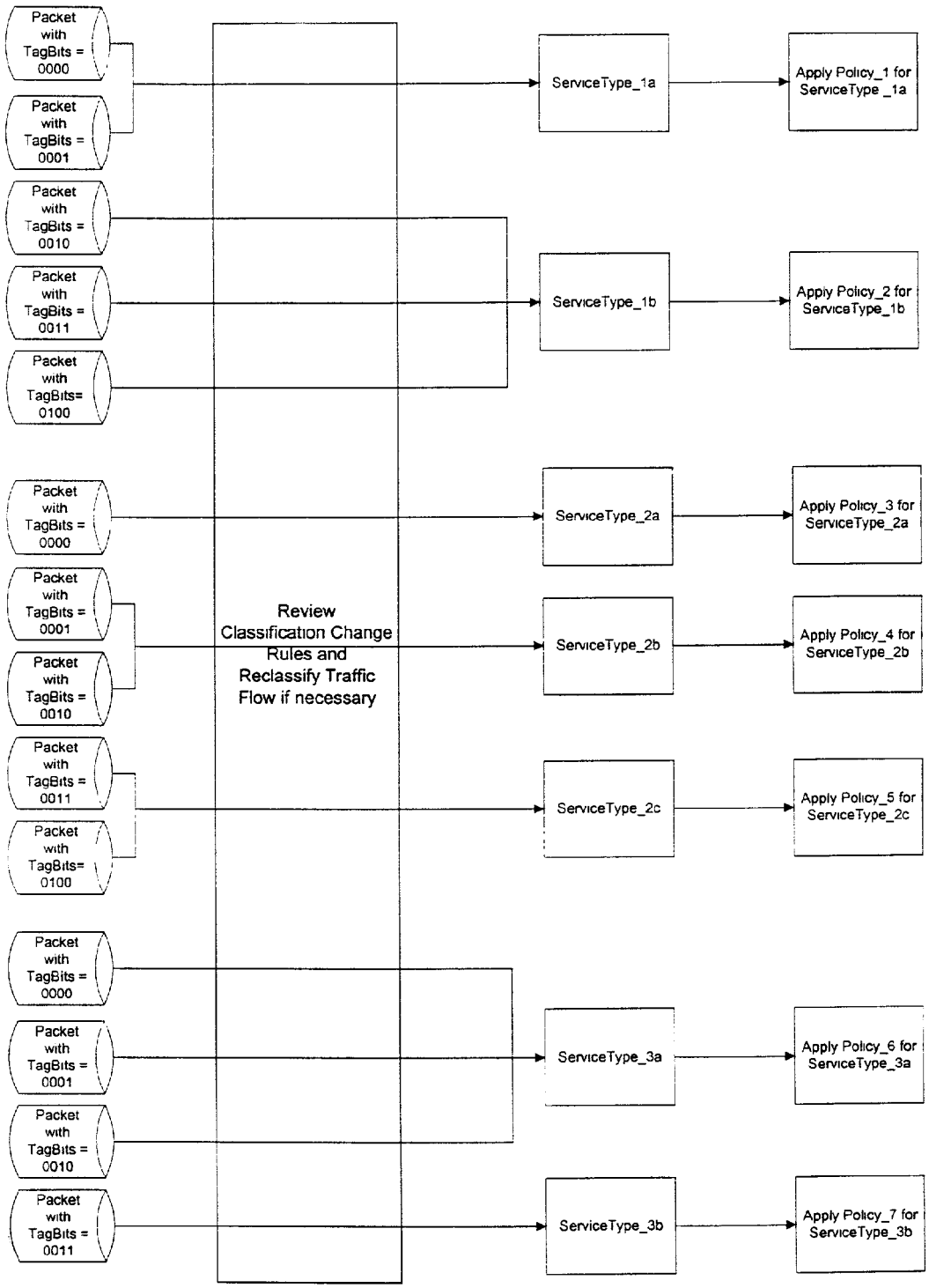
FIG. 6 illustrates an exemplary mapping of tagged bits to service type and policy.

An exemplary illustration of this mapping is provided in FIG. 6. Referring to FIG. 6, a series of packets with tag bits are shown along with their service type and policy. A set of classification change rules are reviewed and the traffic flow may be reclassified if necessary.

A Bandwidth Manager for Handling Citrix ICA Virtual Channel Tags

Virtual channel tags were introduced with Citrix MetaFrame 1.8. In Citrix MetaFrame 1.8, an add-on package of Feature Release 1 included Citrix Independent Computing Architecture (ICA) Virtual Channel Tags. Virtual channel tags are part of the protocol a Citrix client and a Citrix server use to communicate application information. In virtual channel tagging, each ICA packet is encoded with a priority tag. These tags range from 0 (most important) to 3 (least important). A major limitation of Citrix ICA Virtual Channel Tags is that the TCP/IP stream cannot be interpreted out of sequence (i.e., each packet must be read in order) and queuing of packets of least importance and expediting of packets of most importance causes problems for the TCP connection.

In one embodiment, the administrator of a bandwidth manager specifies subclasses within the Citrix ICA service that correspond in a one-to-one or a one-to-many mapping of a class to a virtual channel tag (value). Once these classes are created, the administrator assigns policies to those classes. These policies may be in keeping with corporate priorities. For example, the administrator assigns a restrictive policy on the class that corresponds to the virtual channel tag value 3, and some sort of protective policy on the class or classes that correspond to the tags in the range 0-2.

In one embodiment, when a Citrix ICA connection occurs, and subclasses have been created, a bandwidth manager handling that connection recognizes changes in the packet tags mid-flow, and switches classes accordingly. In this manner, the bandwidth manager reclassifies the connection based on changes in the virtual channel tags. This is exemplified in the example below. For example, assume that the administrator has set up classes for each virtual channel tag value.

Specifically, when the bandwidth manager sees a packet with a virtual channel priority tag value that is numerically larger than the one it has been seeing, the bandwidth manager switches the class to the class assigned to the largest priority tag value, and stays in that class for a period of time. For example, with the following simulated string of Citrix ICA Virtual Channel Tags, the bandwidth manager performs class changes as follows:

000000000000101011110101033333332232210233333331111112011211

^starting at class 0 ^switching to class 1 ^switching to class 3 for a while last, waiting to switch back ^

The amount of time it takes for the bandwidth manager to switch to the class associated with largest priority tag value may vary for different embodiments. For example, in one embodiment, after the bandwidth manager sees the last packet of that large priority tag value, there is a wait of a predefined period of time to ensure that it really was the last packet. Then the bandwidth manager switches the class to the class associated with the next largest priority tag value. In one embodiment, the time interval is 60 seconds.

Continuing the above example,

22202221211111111111110101010111111111111111110001111111111

^OK, time's up, now switching to 2 ^time's up since final '2', switching back to 1

Since there are policies applied to each priority tag value class, different amounts of control are applied to the connection as the classes assigned to the connection change.

Print traffic on an ICA connection is important to certain parties. Print traffic is labeled with an ICA Virtual Channel Tag with the value of 3, and the tag is embedded in the ICA flow. To handle print traffic embedded in ICA, a class is created. In one embodiment, a more restrictive rate control policy is created for the class for the traffic with the tag value "3" and a less restrictive and more protective rate control policy may be configured for the class that corresponds to traffic on other virtual channels that are part of the same ICA connection. Thus, when a priority tag "3" is encountered in a flow of packets in one connection, a bandwidth manager switches the class associated with the connection.

An Exemplary System

FIG. 7 illustrates an exemplary digital processing system 700 for performing the operation of FIG. 4. For example, digital processing system 700 can represent content server 101 or client 106 as described in FIG. 1A. Digital processing system 700 may store a set of instructions for causing the system to perform any of the operations as explained above. Digital processing system 700 can also represent a client on a network or other types of network devices, which include a network router, a network switch, or a network bridge or gateway. Digital processing system 700 can also represent a client being a portable electronic device such as, for example, a personal data assistant, a mobile device, a web appliance, or any other type of machine capable of executing a sequence of instructions that specify actions to be taken by that machine.

Referring to FIG. 7, digital processing system 700 includes a bus 708 coupled to a central processing unit (CPU) 702, main memory 704, static memory 706, network interface 722, video display 710, alpha-numeric input device 712, cursor control device 714, drive unit 716, and signal generation device 720. The devices coupled to bus 708 can use bus 708 to communicate information or data to each other. Furthermore, the devices of digital processing system 700 are exemplary in which one or more devices can be omitted or added. For example, one or more memory devices can be used for digital processing system 700.

The CPU 702 can process instructions 726 or instructions 726 stored in main memory 704 or a machine-readable medium 724 within drive unit 716 via bus 708. For one embodiment, CPU 702 can process and execute instructions 726 to implement the operations as described herein. Bus 808 is a communication medium for communicating data or information for digital processing system 700.

Main memory 704 can be, e.g., a random access memory (RAM) or some other dynamic storage device. Main memory 704 stores instructions 726, which can be used by CPU 702. Main memory 704 may also store temporary variables or other intermediate information during execution of instructions by CPU 702. Static memory 706, can be, e.g., a read only memory (ROM) and/or other static storage devices, for storing information or instructions, which can also be used by CPU 702. Drive unit 716 can be, e.g., a hard or floppy disk drive unit or optical disk drive unit, having a machine-readable medium 724 storing instructions 726. The machine-readable medium 724 can also store other types of information or data.

Video display 710 can be, e.g., a cathode ray tube (CRT) or liquid crystal display (LCD). Video display device 710 displays information or graphics to a user. Alpha-numeric input device 712 is an input device (e.g., a keyboard) for communicating information and command selections to digital processing system 700. Cursor control device 714 can be, e.g., a mouse, a trackball, or cursor direction keys, for controlling movement of an object on video display 710. Signal generation device 720 can be, e.g., a speaker or a microphone.

Digital processing system 700 can be connected to a network 702 via a network interface device 722. Network interface 722 can connect to a network such as, for example, a local area network (LAN), wide area network (WAN), token ring network, Internet, or other like networks. Network interface device 722 can also support varying network protocols such as, for example, hypertext transfer protocol (HTTP), asynchronous transfer mode (ATM), fiber distributed data interface (FDDI), frame relay, or other like protocols.

Thus, a method and system for controlling network traffic with different tags within the same connection by applying different policies for each tag have been described. In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

APPENDIX

The following portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

This source code uses a timer as described above in conjunction with the bandwidth manager handling Citrix ICA Virtual Channel Tags.

```
SET_VAR gTimerDuration = 1 * 30 * 1000;
staticf void
initStuff(SpecificStuff *stuff)
{
  int i;
  stuff->state = STATE_NEW;
  stuff->count = 0;
  stuff->curprio = 0;
  stuff->savedprio = 0;
  for (i = 0; i < NUM_LEVELS; i++) {
    nInitTimer(&stuff->Contents [i]);
    stuff>lastTime[i] = 0;
  }
  stuff->HeadContent = 0;
  return;
}
static __inline TICK
recentHighestPrio(SpecificStuff *stuff)
{
  int i;
  TICK high = 0;
  TICK now = sysTick( );
  for (i = 0; i < NUM_LEVELS; i++) {
    if (stuff->lastTime[i] > (now - TIMER_DURATION)) {
      high = i;
    }
  }
  return high;
}
staticf void
resetPrio(NMPtr nm, int p)
{
  SpecificStuff *stuff = (SpecificStuff *)nm->private;
  NAttributePtr na;
  na = nGetAttribute(nm, ATT_TAG);
  if (!na) return;
  na->value[0] = '0' + p;
  debugBlurt1("to %c", na->value[0]);
  /* change priority attribute to be p */
  stuff->savedprio = p;
  return;
}
staticf void
CheckPrio(INFO_PTR flowInfoPointer, NMPtr nm)
{
  SpecificStuff *stuff = (SpecificStuff *)nm->private;
  int recent;
  recent = recentHighestPrio(stuff);
  if (stuff->savedprio != recent) {
    resetPrio(nm, recent);
    reclassifyFlowAsServiceType (flowInfoPointer, SVC_TYPE);
  }
  return;
}
staticf int
```

```
-continued

TimerExpires(struct apptimer *at, INFO_PTR flowInfoPointer,
NMPtr nm)
{
  CheckPrio(flowInfoPointer, nm);
  return 0;
}
staticf BOOL
LookAtFlow }
  NMPtr  nm,
  INFO_PTR       flowInfoPointer)
{
  stuff = (SpecificStuff *)nm->private;
  if (flowInfoPointer->isTCP) {
    switch (stuff->state) {
      case STATE_COMMUNICATION:
        *lo = flowInfoPointer->header.dataStart[0];
        *hi = flowInfoPointer->header.dataStart[1] & 0xFF;
        prio = (flowInfoPointer->header.dataStart[1] & 0x00) >> 8;
        len = *(UINT16 *)&lena;
        stuff->next[bcb_direction(flowInfoPointer>bcb)] =
flowInfoPointer->header.seq + (len + 2);
        if (prio != stuff->curprio) {
          /* if the prio of this packet is higher than the saved
             one, then we want to reclassify immediately. it is
             only when we are headed down that we delay until
             the timer goes off */
          if (prio > stuff->curprio)
            CheckPrio(flowInfoPointer, nm);
          nSetTimer(&stuff->HeadContent, &stuff-Contents[(int)prio],
sysTick( ),
                  TIMER_DURATION);
        }
        stuff->lastTime[stuff->curprio} = sysTick( );
        stuff->curprio = prio;
        return TRUE;         /* change */
      default:
        warn1("unknown state %d", stuff>state);
        stuff->count = 0;
        return FALSE;
    }
}
```

What is claimed is:

1. A method comprising:
receiving, over a connection, one or more packets of a traffic flow, the one or more packets having respective packet tag values;
assigning a policy to the traffic flow based on the respective packet tag values of the one or more packets;
determining respective packet tag values of one or more newly received packets over a connection has changed from previously received packet tag values within the traffic flow; and
modulating, using a hysteresis response to a change in received packet tag values within the traffic flow of said connection, the policy applied to the one or more packets in response to identifying the change in the respective packet tag values of the one or more newly received packets.

2. An apparatus comprising:
an intra-flow modulator to modulate policies applied to packets within a traffic flow of a connection using a hysteresis response to changes in received packet tag values within the traffic flow of said connection, wherein the intra-flow policy modulator comprises
a classification module to receive incoming packets within the traffic flow, assign a traffic class to the incoming packets based on a packet tag in the incoming packets, and vary the traffic class applied to the traffic flow of the connection in response to receipt of a different priority tag in subsequent incoming packets of the traffic flow; and a policy module to assign a policy to the incoming packets within the traffic flow based on the assigned traffic class and to control outgoing packets of the traffic flow based on the assigned policy.

3. The apparatus defined in claim 2 wherein the intra-flow policy modulator performs the hysteresis response when varying traffic classes in response to the different packet tag having a higher priority.

4. The apparatus defined in claim 2 wherein the connection comprises a TCP connection.

5. The apparatus defined in claim 2 wherein the classification module identifies a service type associated with the incoming packet and determines whether to change the traffic class assignment based on the service type.

6. The apparatus defined in claim 5 wherein the classification module determines whether to change the traffic class assignment is based on the service type associated with the incoming packet.

7. The apparatus defined in claim 2 wherein the classification module uses a mapping of tag bits to its traffic class and a policy.

8. The apparatus defined in claim 7 wherein the classification module changes the mapping between at least one of the plurality of tag bits and its traffic class and policy based on a set of classification change rules.

9. The apparatus defined in claim 2 wherein the policy module applies a policy to the incoming packets based on assigned traffic class and controls outgoing packets based on the assigned policy for the incoming packets.

10. The apparatus defined in claim 9 wherein the policy manager controls the outgoing packets by providing less importance to packets having a first type of tag and more importance to packets having a second type of tag using the assigned policy for the incoming packets.

11. A method comprising:
mapping policies to traffic classes associated with flows of packets within respective connections in a network;
modulating assignment of traffic classes to individual packet flows within the connections in the network based on one or more changes in packet tags of packets within respective ones of the individual connections using a hysteresis response to changes in received packet tags within the respective ones of the individual connections.

12. An apparatus comprising:
means for mapping policies to traffic classes associated with flows of packets within respective connections in a network;
means for modulating assignment of traffic classes to individual packet flows within the connections in the network based on one or more changes in packet tags of packets within respective ones of the individual connections using a delayed hysteresis response to changes in received packet tags within the respective ones of the individual connections.

13. A method comprising:
assigning a first traffic class to incoming traffic within a connection based on a first Independent Computing Architecture (ICA) Virtual Channel Tag of a first packet in the incoming traffic;
assigning a second traffic class to the incoming traffic within the connection based on a second ICA Virtual Channel Tag of a second packet within the connection in the incoming traffic to reclassify the connection in response to changes in ICA Virtual Channel Tags;
applying a policy to the incoming traffic based on an assigned traffic class; and
controlling outgoing traffic based on the assigned policy for the incoming traffic.

14. The method defined in claim 13 wherein the incoming traffic includes a sequence of packets in order for which out of order delivery degrades performance for the single connection.

15. The method defined in claim 13 wherein the connection comprises a TCP connection.

16. The method defined in claim 13 further comprising varying policies applied to the connection.

17. The method of claim 13 further comprising determining a relative importance of different types of tagged traffic within one TCP connection.

18. The method defined in claim 13 further comprising:
identifying a service type associated with the second packet; and
determining to change the traffic class assignment for incoming traffic of the connection based on the service type.

19. The method defined in claim 18 wherein determining whether to change the traffic class assignment is based on the service type associated with the second packet.

20. The method defined in claim 18 further comprising:
checking for a policy for the second traffic class;
applying the policy to the connection.

21. The method defined in claim 13 further comprising mapping a plurality of ICA Virtual Channel Tags to a traffic class and a policy.

22. The method defined in claim 21 further comprising changing a mapping between at least one of the plurality of ICA Virtual Channel Tags and its traffic class and policy based on a set of classification change rules.

23. The method defined in claim 13 further comprising:
applying a policy to the incoming traffic based on an assigned traffic class; and
controlling outgoing traffic based on the assigned policy for the incoming traffic.

24. The method defined in claim 23 wherein the controlling of the outgoing traffic includes providing less importance to traffic having a first type of ICA Virtual Channel Tag and more importance to traffic having a second type of ICA Virtual Channel Tag using the assigned policy for the incoming traffic.

25. The method defined in claim 13 wherein the incoming traffic comprises print traffic.

26. The method defined in claim 13 wherein the connection comprises a Citrix connection, and further comprising:
specifying subclasses within a Citric ICA service that correspond to a mapping of the traffic class to the Virtual Channel Traffic Tag value;
assigning a policy to each of the subclasses;
recognizing a change in the virtual channel traffic tag value while receiving packets in the connection; and
switching the traffic class to another in response to the change in the virtual channel traffic tag value.

27. The method defined in claim 13 wherein the connection comprises a Citric connection, and further comprising:
receiving a packet having a virtual channel priority tag numerically larger than the virtual channel priority tag of a previous packet;
switching the first traffic class to a new traffic class assigned to the largest priority tag value.

28. The method defined in claim 27 further comprising remaining in the new traffic class for a period of time; and switching to the first traffic class assigned to next largest priority tag value after a predetermined time.

29. An apparatus comprising:
a classification module operative to receive incoming traffic and to assign a first traffic class to the incoming traffic based on a Independent Computing Architecture (ICA) Virtual Channel Tag in the incoming traffic, wherein the classification module varies the assigned traffic class applied to a connection in response to receipt of a different IC Virtual Channel Tag in the incoming traffic; and
a policy module operative to assign a policy to the incoming traffic based on the assigned traffic class and to control outgoing traffic based on the assigned policy for the incoming traffic.

30. The apparatus defined in claim 29 wherein the incoming traffic includes a sequence of packets in order for which out of order delivery degrades performance for the single connection.

31. The apparatus defined in claim 29 wherein the connection comprises a TCP connection.

32. The apparatus defined in claim 29 wherein the classification module identifies a service type associated with the incoming packet and determines whether to change the traffic class assignment based on the service type.

33. The apparatus defined in claim 32 wherein the classification module determines whether to change the traffic class assignment based on the service type associated with the incoming packet.

34. The apparatus defined in claim 29 wherein the policy module assigns a policy to each traffic class.

35. The apparatus defined in claim 29 wherein the classification module maps a plurality of ICA Virtual Channel Tags to a traffic class and a policy.

36. The apparatus defined in claim 35 wherein the classification module changes a mapping between at least one of the plurality of ICA Virtual Channel Tags and its traffic class and policy based on a set of classification change rules.

37. The apparatus defined in claim 29 wherein the policy module applies a policy to the incoming traffic based on assigned traffic class and controls outgoing traffic based on the assigned policy for the incoming traffic.

38. The apparatus defined in claim 37 wherein the policy manager controls the outgoing traffic by providing less importance to traffic having a first type of ICA Virtual Channel Tag and more importance to traffic having a second type of ICA Virtual Channel Tag using the assigned policy for the incoming traffic.

39. The apparatus in claim 29 wherein incoming traffic comprises print traffic.

40. The apparatus defined in claim 29 wherein the packet tag comprises a priority tag.

41. An apparatus comprising:
means for assigning a first traffic class to incoming traffic within a connection based on a first Independent Computing Architecture (ICA) Virtual Channel Tag of a first packet in the incoming traffic;
means for changing the traffic class assigned to the incoming traffic based on a second ICA Virtual Channel Tag of a second packet within the connection in the incoming traffic, such that the connection is reclassified in response to changes in ICA Virtual Channel Tags;
means for applying a policy to the incoming traffic based on an assigned traffic class; and
means for controlling outgoing traffic based on the assigned policy for the incoming traffic.

42. A computer-readable storage medium for storing executable instructions which, if executed by a computing system, causes the computing system to:
assign a first traffic class to incoming traffic within a connection based on a first Independent Computing Architecture (ICA) Virtual Channel Tag of a first packet in the incoming traffic;
change the traffic class assigned to incoming traffic based on a second ICA Virtual Channel Tag of a second packet within the connection in the incoming traffic, such that the connection is reclassified in response to changes in ICA Virtual Channel Tags;
apply a policy to the incoming traffic based on an assigned traffic class; and
control outgoing traffic based on the assigned policy for the incoming traffic.

43. A bandwidth manager comprising:
a TCP conditioner-based policy modulator operative to modulate policies applied to packets of a TCP connection based on a determination as to whether each of the packets will arrive substantially out of order, wherein the TCP conditioner-based policy modulator comprises
a classification module to receive incoming traffic, assign a traffic class to the incoming traffic based on a packet tag in the incoming traffic, and vary the traffic class applied to the connection in response to receipt of a different packet tag in the incoming traffic; and
a policy module to assign a policy to the incoming traffic based on the assigned traffic class and to control outgoing traffic based on the assigned policy for the incoming traffic.

44. The bandwidth manager defined in claim 43 wherein the TCP conditioner-based policy modulator performs a hysteresis response when varying traffic classes in response to the different packet tag having a higher priority.

45. The bandwidth manager defined in claim 43 wherein the classification module identifies a service type associated with the incoming traffic and determines whether to change the traffic class assignment based on the service type.

46. The bandwidth manager defined in claim 45 wherein the classification module determines whether to change the traffic class assigned to the incoming traffic based on the service type associated with the incoming traffic.

47. The method defined in claim 43 wherein the classification module uses a mapping of tag bits to its traffic class and a policy.

48. The method defined in claim 47 wherein the classification modules changes the mapping between at least one of the plurality of tag bits and its traffic class and policy based on a set of classification change rules.

49. The bandwidth manager defined in claim 43 wherein the policy module applies a policy to the incoming traffic based on assigned traffic class and controls outgoing traffic based on the assigned policy for the incoming traffic.

50. The bandwidth manager defined in claim 49 wherein the policy manager controls the outgoing traffic by providing less importance to traffic having a first type of tag and more importance to traffic having a second type of tag using the assigned policy for the incoming traffic.

* * * * *